United States Patent
Kim et al.

(10) Patent No.: US 8,073,847 B2
(45) Date of Patent: Dec. 6, 2011

(54) EXTENDED USER PROFILE

(75) Inventors: Jacob Dong Ju Kim, Issaquah, WA (US); Charles Bassett, Seattle, WA (US); Randee Bierlein, Bellevue, WA (US); Helen Tam, Kirkland, WA (US); John Bruno, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 12/147,514

(22) Filed: Jun. 27, 2008

(65) Prior Publication Data
US 2009/0327314 A1  Dec. 31, 2009

(51) Int. Cl.
G06F 7/00 (2006.01)
G06F 17/30 (2006.01)
(52) U.S. Cl. ........................................... 707/732
(58) Field of Classification Search ............. None
See application file for complete search history.

(56) References Cited

U.S. PATENT DOCUMENTS

| | | |
|---|---|---|
| 6,195,651 B1 | 2/2001 | Handel et al. |
| 6,988,103 B2 | 1/2006 | Chithambaram |
| 2002/0184406 A1 | 12/2002 | Aliffi |
| 2003/0050911 A1 | 3/2003 | Lucovsky et al. |
| 2005/0210409 A1 | 9/2005 | Jou |
| 2006/0224602 A1 | 10/2006 | Rawat |
| 2007/0043720 A1 | 2/2007 | Koenig |
| 2007/0179863 A1 | 8/2007 | Stoll |
| 2007/0239722 A1 | 10/2007 | Phillips |
| 2007/0297590 A1 | 12/2007 | Macbeth |
| 2009/0031301 A1* | 1/2009 | D'Angelo et al. ............ 717/178 |

FOREIGN PATENT DOCUMENTS

| | | |
|---|---|---|
| KR | 10-2000-0054241 A | 9/2000 |
| KR | 10-2007-0109524 A | 11/2007 |
| WO | 0031664 A2 | 6/2000 |

OTHER PUBLICATIONS

Buono et al, "Integrating User Data and Collaborative Filtering in Web Recommendation System", 2002, 7 pages.*
International Search Report and Written Opinion for PCT Application No. PCT/US2009/045098, mailed on Dec. 30, 2009, 11 pages.
"What if Applications Could be Managed Like Data?", Strategic Solutions and Technical Benefits of the SoftGrid Application Virtualization Platform, Softricity, May, 2005, 13 pgs. http://www.vpit.ualberta.ca/aict/softricity/pdf/white_paper.pdf.

(Continued)

*Primary Examiner* — Uyen T. Le

(57) ABSTRACT

A method of extending user profile. A user specific data related to an application is received and stored for integration with a user profile. A template for the application is received and stored. The template tailors the user specific data based on aesthetic preferences of the user to generate a tailored user specific data. The user profile is extended based on the user specific data for the application and the template for the application. The user profile including the tailored user specific data may be provided for rendering. Local information, e.g., geographical location, of the user may be determined to tailor the user profile based on the local information. The user specific data and/or the template may be in a markup language format. Update to the user specific data and/or template may be pushed when available.

20 Claims, 5 Drawing Sheets

OTHER PUBLICATIONS

"Share your Data, Keep your Secrets", User Profile Management in Converged Networks (Episode II), Arnaud Sahuguet, Bodgan Alexe, Irini Fundulaki, Pierre-Yves Laligand, Abdullatif Shikra and Antoine Arnail, CIDR Conference, Asilomar, Ca., Jan., 2005, 32 pgs.

"User Profile Structure", Mar. 1, 2002, 7 pgs., http://technet2.microsoft.com/windowsserver/en/library/093238f3-5064-470e-a281-0eb1c28b9cf01033.mspx?mfr=true.

International Preliminary Report on Patentability cited in PCT Application No. PCT/US2009/045098 dated Jan. 13, 2011.

Communication—Amendment of the application cited in EP Application No. 09770628.7—1238 dated Feb. 3, 2011.

Facebook Developers Wiki http://wiki.developers.facebook.com/index.php/Profile.setFBML printed Apr. 18, 2008. 3 pages.

* cited by examiner

EXTENDED USER PROFILE

BACKGROUND

The widespread use and increasing development of the Internet has allowed exchanges of information in ways previously not possible. The Internet has allowed social networks to now be made available online. Social networks enable users to publish and share information, e.g., their name, school, metropolitan groups, events, activities, interests, etc., with the people they care about and to interact with other users online. For example, commercial social networking sites such as MySpace™, Facebook™, Orkut™, etc., are now a common place for online users, especially among the younger generation.

In general, users of social network sites can publish and customize their profiles based on the capabilities and limitations of the social network site. For example, users can publish information by filling in specific boxes provided by the social network site. Furthermore, users can rearrange how the entered information is being published and rendered, thereby tailoring the published profile to their personal preferences given the capabilities of the commercial social networking sites.

Unfortunately, users are unable to customize their profile beyond the limitations provided by the social network site. For example, users that wish to publish their latest result, e.g., their score and level completed, in playing a set top console game device such as, for example, X-Box™, PlayStation™, Nintendo™, etc. are unable to do so if the social network does not provide an input mean for entering and publishing that information. In other words, applications to be rendered and published by a given social network site is limited to the specific implementation of the site and is non-extendable. As such, it is difficult to aggregate additional information, beyond what is offered by social network sites, to become part of the user profile.

Publishing to a typical user profile requires the user to manually enter the information to be published as part of the user profile. For example, a user is required to manually enter information about a given application to be published as part of the user profile, e.g., level and score achieved in a particular game. In other words, there is no automatic mean of capturing information related to a given application to be published and rendered by the social network site except by requiring the user to manually enter that information.

Moreover, a user is required to manually enter updated information in order to reflect new developments in order to update the user profile. For example, the user is required to manually enter new results for a given game, e.g., completed level 4 with the score of 613, in order to update a previously accomplished result, e.g., completed level 3 with the score of 200. In other words, updating user profile is performed manually as new information becomes available.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A need has arisen to extend and aggregate additional information to become part of a user profile, beyond what is being offered by the social network site. Moreover, a need has arisen to automatically capture information for publication and rendition by the social network as part of a user profile. Furthermore, a need has arisen to automatically update a user profile on a social network. Described herein is technology for, among other things, extending user profiles on a social network as well as automatically capturing user specific data for various applications and automatically updating a user profile. Therefore, users can now extend their profile to applications beyond that being supported by social networks. Moreover, users are now relieved from manually entering various information including updating various user specific data as they become available.

In one embodiment, a user may wish to include their performance from playing a particular console game as part of the user profile. A user specific data, e.g., the user's performance such as level and score completed, related to an application, e.g., a console game, may be received and stored. A template used for the application may also be sent by the application, e.g., console video game, and received by the server. The template may be used to tailor the user specific data in accordance with aesthetic preferences of the user. It is appreciated that while user specific data may change often, the template is relatively static and does not change unless the user changes the template.

The user specific data may be tailored based on the template and added as a portion of the user's extended profile. Thus, the user profile is extended to include the user selected application. It is appreciated that according to one embodiment, the user specific data may be further tailored based on the geographical location of the user. For example, if the user is in Spain, the user profile or a portion of the user profile comprising the user specific data related to the application may be tailored and rendered in Spanish. It is appreciated that in one embodiment, the user may be authenticated prior to extending the user profile. It is appreciated that updated user specific data and/or template may be pushed by the application when they become available.

As such, techniques described herein provide a way to extend a user profile in a social network. Moreover, the user specific information may be automatically supplied for rendition as part of the user profile. Furthermore, the user specific information may be automatically updated and tailored based on the aesthetic preferences and/or geographical location of the user. As a result, quality of service and page load time may also be improved.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
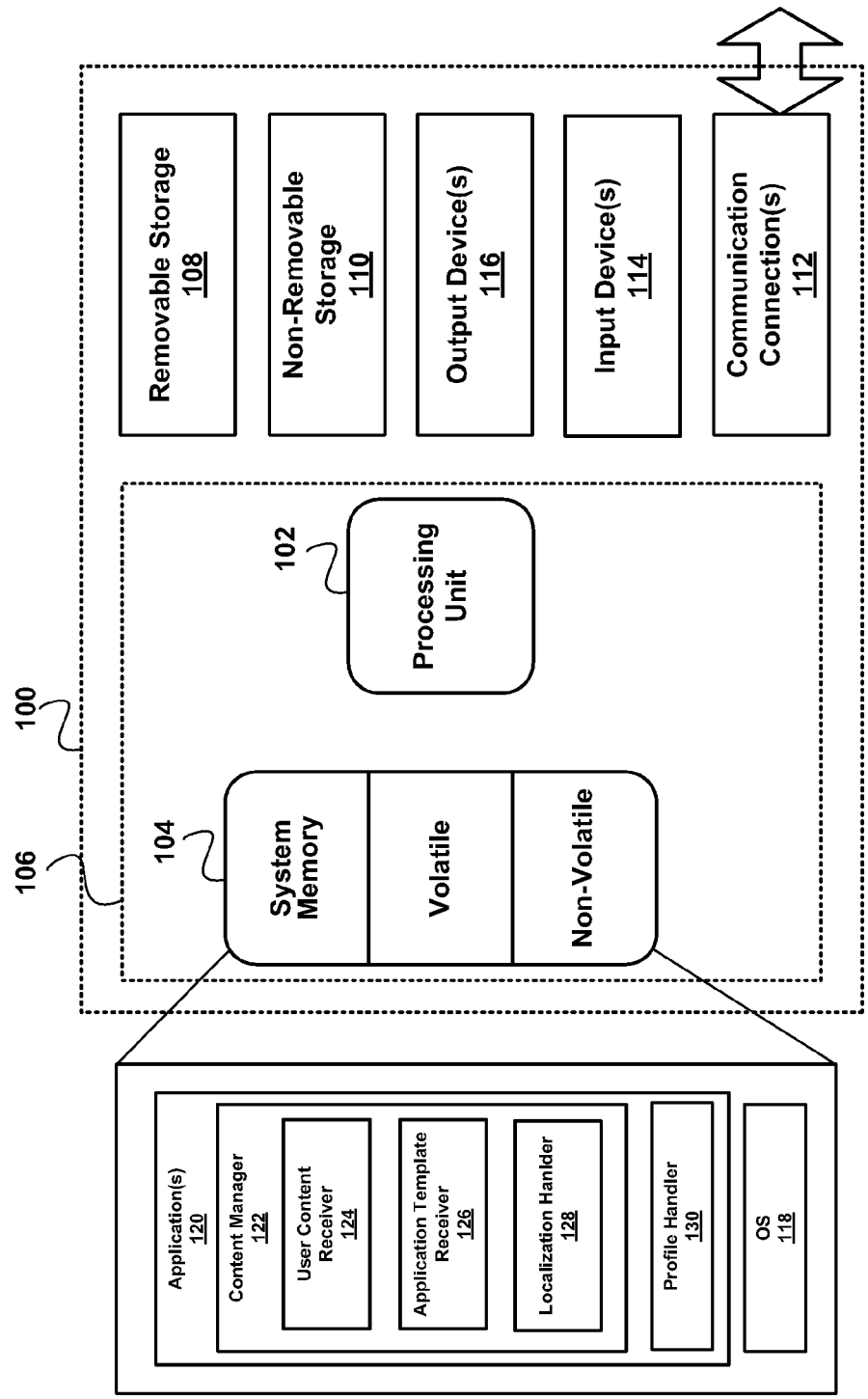
FIG. 1 shows a block diagram of an exemplary computing system environment for implementing an embodiment.

Reference will now be made in detail to embodiments of the claimed subject matter, examples of which are illustrated in the accompanying drawings. While the invention will be described in conjunction with the embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail so as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or "sending" or "extending" or "storing" or "rendering" or "authenticating" or "tailoring" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

A need has arisen to extend and aggregate additional information to become part of a user profile, beyond what is being offered by the social network site. Moreover, a need has arisen to automatically capture information for publication and rendition by the social network as part of a user profile. Furthermore, a need has arisen to automatically update a user profile on a social network. Described herein is technology for, among other things, extending user profile on a social network as well as automatically capturing user specific data for various applications and automatically updating a user profile. Therefore, users can now extend their profile to applications beyond that being supported by social networks. Moreover, users are now relieved from manually entering various information including updating various user specific data as they become available.

In one embodiment, a user specific data that may be related to an application is received. For example, the user's performance in playing a console game may be sent from the console video game and received by a server. The user performance may be the level completed and the score, for instance. In this example, the user may wish to include the performance in playing the console game as part of the user profile. As such, the received user specific data is operable for rendition and integration within the user profile. It is appreciated that the user specific data may be received in a markup language format, e.g., extensible markup language (XML). The user specific data may be stored.

A template used for the application may also be sent by the application, e.g., console video game, and received by the server. The template may be used to tailor the user specific data in accordance with aesthetic preferences of the user. It is appreciated that while user specific data may change often, the template is relatively static and does not change unless the user changes the template. In other words, the template may be generic and common to many of the users of the application. The template may be stored for subsequent use.

The user specific data may be tailored based on the template and added as a portion of the user's extended profile. Thus, the user profile is extended to include the user selected application. The tailored user specific data may be provided for rendition as a portion of the user profile, thereby extending the user profile. It is appreciated that a display, e.g., a liquid crystal display (LCD), may render the tailored user specific data.

It is appreciated that according to one embodiment, the user specific data may be further tailored based on the geographical location of the user. For example, if the user is in Spain, the user profile or a portion of the user profile comprising the user specific data related to the application may be tailored and rendered in Spanish. Similarly, if the user is in an English speaking country, the user profile or a portion of the user profile comprising the user specific data related to the application may be tailored and rendered in English.

In one embodiment, the user may be authenticated prior to extending the user profile. It is appreciated that updated user specific data and/or template may be pushed by the application when they become available. For example, once the user completes a new level of a console game, the new user specific data may be pushed onto the social network such that the user profile can be updated. It is appreciated that prior to updating the user profile, the identity of the user may be confirmed by authenticating the user. The template may not change as often as the user specific data. As such, the template may be stored and be used to tailor the updated user specific data once the new user specific data is pushed. However, it is appreciated that once a new template is received, it may replace the old template such that user specific data whether new or old can be tailored and rendered based on the new template in accordance with user aesthetic preferences.

As such, techniques described herein provide a way for the extending a user profile in a social network. Moreover, the user specific information may be automatically supplied for rendition as part of the user profile. Furthermore, the user specific information may be automatically updated and tailored based on the aesthetic preferences and/or geographical location of the user.

EXAMPLE OPERATING ENVIRONMENTS

With reference to FIG. 1, an exemplary system for implementing embodiments includes a general purpose computing system environment, such as computing system environment 100. Computing system environment 100 may include, but is not limited to, servers, desktop computers, laptops, tablet PCs, mobile devices, and smartphones. In a basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This basic configuration is illustrated in FIG. 1 by dashed line 106.

System memory 104 may include, among other things, Operating System 118 (OS), application(s) 120, and content manager 122. Content manager 122 may facilitate management of content that is public, limited access, and private, e.g., a website, a family photo album, financial documents, achievements in a video game, etc. Content manager 122 may further include user content receiver 124 which handles receiving and storing of user specific data for a given application, e.g., user performance in a console video game. The console video game may be X-Box™, PlayStation™, Nintendo™, etc. Moreover, the application may include any application, e.g., a photo manager, news update, etc. Content manager 122 may also receive and store templates for various applications in an application template receiver 126. The application template receiver stores templates that may be a generic template for an application that tailors a user specific content based on aesthetic preferences of a user. The content manager 122 may further include a localization handler 128 that handles information regarding a geographical location of a user, e.g., when a user resides in Spain the content is published in Spanish, etc. A profile handler 130 may be used to tailor user specific data for rendering as part of a user profile. The tailored user specific data may be based on the information stored in the user content receiver 124, application template receiver 126 and the localization handler 128.

Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 112 may allow computing system environment 100 to communication over various networks types including, but not limited to, Bluetooth, Ethernet, Wi-fi, Infrared Data Association (IrDA), Local area networks (LAN), Wireless Local area networks (WLAN), wide area networks (WAN) such as the internet serial, and universal serial bus (USB). It is appreciated the various network types that communication connection(s) 112 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 100 may also have input device(s) 114 such as a keyboard, mouse, pen, voice input device, touch input device, remote control, etc. Output device(s) 116 such as a display, speakers, etc. may also be included. All these devices are well known in the art and need not be discussed at length here.

EXAMPLE SYSTEM

Figure 2:
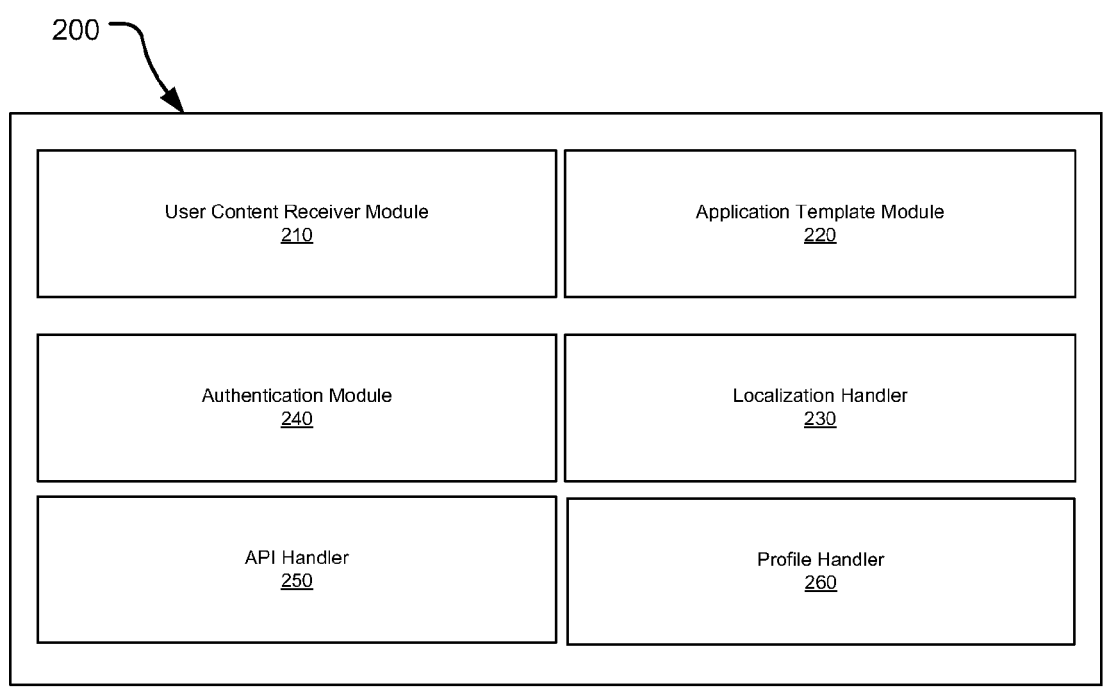
FIG. 2 shows a block diagram of an exemplary system for extending user profile, in accordance with an embodiment.

The following discussion sets forth details of the present technology systems for network communication management. FIG. 2 illustrates example components used by various embodiments of the present technology. System 200 includes components or modules that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1.

FIG. 2 shows a block diagram of an exemplary system for extending user profile, in accordance with an embodiment. System 200 may comprise a user content receiver module 210, an application template module 220, a localization handler module 230, an authentication module 240, an application programming interface (API) handler 250 and a profile handler 260.

According to one embodiment, system 200 receives a user specific data, e.g., score and level completed, by an application, e.g., X-Box™ video game. It is appreciated that there may be an optional call to an application provider when the application is installed by the user to start the publishing model. Based on the optional call various information, e.g., specific user, user preference on information to be published, token that can be used for API and geographical location, may be obtained. It is further appreciated that various exemplary embodiments refer to X-Box™ video game as an example of an application. However, embodiments should not be construed as limited to X-Box™ video game since X-Box™ video game is provided as an example. For example, other applications may include other video console games, e.g., PlayStation™, Nintendo™, photo manager, etc. and/or non-video console game applications such as a photo manager, news update manager, etc. Thus, the use of X-Box™ and/or video game console is exemplary and should not be construed as limiting the scope of the embodiments presented herein.

Moreover, the system 200 may receive a template that tailors the user specific data based on aesthetic preferences of the user. As such, when the portion of the user profile that relates to the application is being rendered, the user specific data may be tailored based on the template. The template may be generic among many users using the same application. The user specific data may further be tailored based on the geographical location of the user, e.g., portion of the user profile related to the application rendered in Spanish if the user resides in Spain. It is appreciated that user specific data and/or template may be in a markup language format, e.g., extensible markup language (XML), hypertext markup language (HTML), extensible HTML (XHTML), etc.

In one embodiment, the API handler 250 is operable to handle various API calls. For example, the API handler 250 may handle an API call to update a user specific data. It is appreciated that the API call may be received when an update for a user specific data is available. For example, the user specific data may be pushed by the application, e.g., X-Box™ game, to the system 200. It is appreciated that pushing data may be implemented using various methods, e.g., representational state transfer (REST) style programmatic API call. The API handler 250 may similarly handle an API call to update a template for tailoring the user specific data in a user profile based on aesthetic preferences of a user.

In one embodiment, when the API handler 250 receives an API call to update a user specific data, the authentication module 240 may authenticate the user and/or the application for which the user specific data is being received. For example, when the API call is received, the authentication module 240 may authenticate the user to confirm the identity of the user and that the user has consented to update the user specific data as part of the user profile. Similarly, the authentication module 240 may authenticate the application to ensure that the format of the user specific data is conforming to the API standard.

After authentication, the user content receiver module 210 may receive and store the newly supplied user specific data. The profile handler 260 may use the user specific data and template to render the information as part of the user profile. For example, the profile handler 260 may tailor newly supplied user specific data, received from the API handler 250 and/or from the user content receiver module 210, by using a template received from the application template module 220. Thus, the tailored user specific data may be rendered as part of the user profile. In other words, the profile handler 260 may use the template from the application template module 220 to tailor the received user specific data and to integrate the tailored user specific data as part of the user profile.

It is appreciated that the template may have been stored prior to the receipt of the updated user specific data. However, it is appreciated that an update for the template may be received in a similar manner to that of the user specific data. The template may also be stored in the application template module 220 for subsequent use. It is appreciated that the profile handler module 260 may send a response back to the application using the API handler module 250. The response may be a signal that the profile has been extended and/or updated successfully and is ready for rendition.

It is appreciated that the user specific data may change frequently in comparison to the template. For example, each time a user launches an application, e.g., X-Box™ video game, the user specific data may change, e.g., completion of a new stage and new score. In comparison, the template may be generic to many users utilizing the same application. It is further appreciated, that the template may be stored for later use in rendering the user profile as long as the template remains unchanged.

It is appreciated that the user specific data may further be tailored based on a geographical location of the user. For example, the localization handler module 230 may allow strings, texts and/or images from the template and/or user specific data to be localized based on the geographical location of the user, e.g., locality. In one exemplary embodiment, when a user resides in Spain, the user specific data and/or the template comprise a set of name and value pairs that define the resource name and the localized resource value, identifying Spain as the geographical location. Thus, Spanish may be used to render the application comprising the user specific data and the template as part of the user profile.

EXAMPLE OPERATIONS

Figure 3:
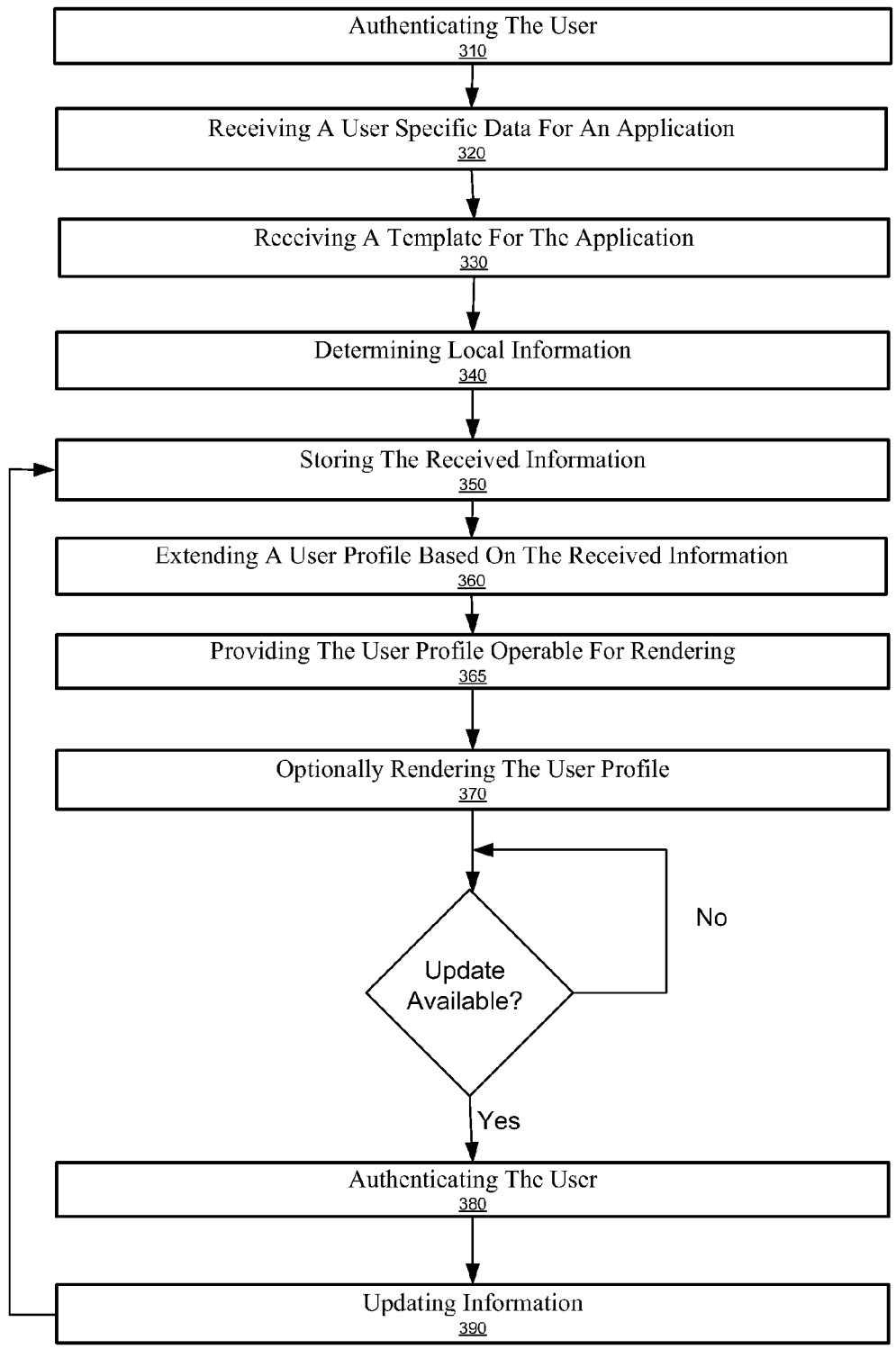
FIG. 3 shows a flowchart of an exemplary process for extending user profile, in accordance with an embodiment.
Figure 4:
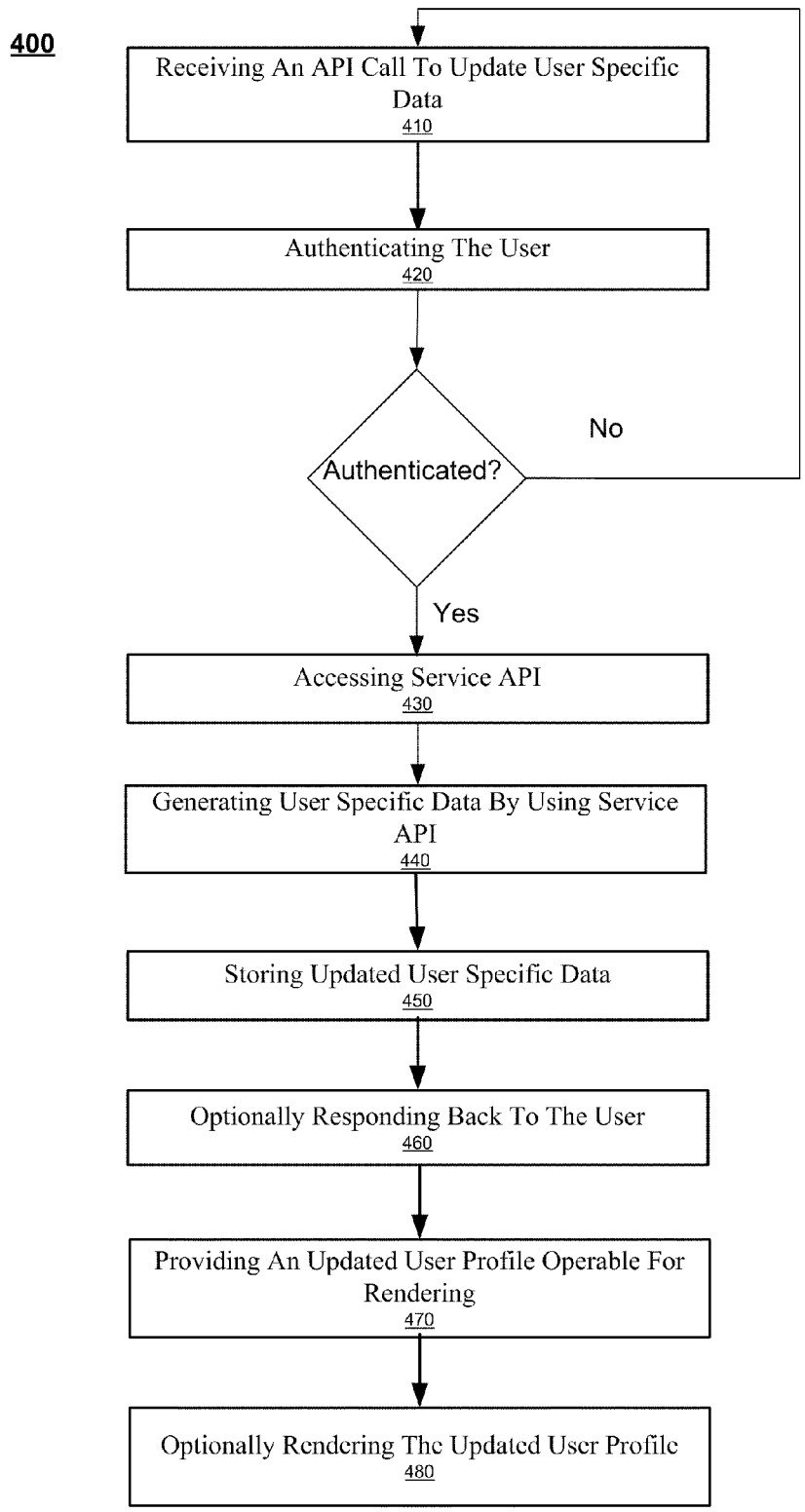
FIG. 4 shows a flowchart of an exemplary process for updating a user profile, in accordance with an embodiment.

The following discussion sets forth in detail the operations of the present technology for content management. With reference to FIGS. 3 and 4, flowcharts 300 and 400 each illustrate example blocks used by various embodiments of the present technology. Flowcharts 300 and 400 include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1.

Referring now to FIG. 3, a flowchart 300 of an exemplary process for extending user profile, in accordance with an embodiment is shown. A user wishes to publish user specific data related to an application as part of the user profile. For example, the user may wish to publish recently accomplished stage and corresponding scores for an X-Box™ video game. At step 310, the user may be authenticated to ensure that the information being supplied by the application, e.g., X-Box™ video game, is based on a request from the user and that the user has consented to publish that information as part of the user profile.

Upon authenticating the user, at step 320, a user specific data for the application may be received. For example, user specific data may be the level and score accomplished by the user in an X-Box™ video game. It is appreciated that the user specific data may be in a markup language format, e.g., extensible markup language (XML), hypertext markup language (HTML), extensible HTML (XHTML), etc. It is further appreciated that the user specific data received may be sent from the application and received by the API handler module 250. The user specific data may be stored at the user content receiver module 210 for later use. As such, the user specific data may also be received from the user content receiver module 210.

At step 330, a template for the user specific data related to the application is received. The template may be a generic template that tailors the user specific data based on the aesthetic preferences of the user. In one embodiment, the template may be a generic template for multiple users whereas the user specific data is specific to each user. The template for example may tailor the user specific data based on a specific font, background image, background color, etc., in order to tailor the user specific data to have a certain "look and feel." The template may be in a markup language format, e.g., extensible markup language (XML), hypertext markup language (HTML), extensible HTML (XHTML), etc. It is appreciated that the template may be received by the API handler module 250 and stored at the application template module 220 for subsequent use. Thus, the template may also be received from the application module 220 after the template is being stored.

It is appreciated that even though step 330 is described to follow step 320, the order of the flow may be different. For example, first at step 330 a template for the user specific data related to the application may be received and then at step 320 a user specific data for the application may be received. As such, the order of which the flow diagram is described should not be construed as limiting the scope of the embodiments.

At step 340, geographical location of the user may be determined. For example, the localization handler module 230 may allow strings, texts and/or images from the template and/or user specific data to be localized based on the geographical location of the user. In one exemplary embodiment, when a user resides in Spain, the user specific data and/or the template comprise a set of name and value pairs that define the resource name and the localized resource value, identifying Spain as the geographical location. Thus, Spanish may be used to render a portion of the user profile that includes the application comprising the user specific data and the template.

At step 350, the received information may be stored. For example, the user specific data may be stored in the user content receiver module 210 and the template (if an updated one) may be stored in the application template module 220. As such, an updated template may replace the original template.

At step 360, the user profile may be extended based on the received information. For example, the user profile may now comprise the application, e.g., X-Box™ video game, along with user specific data, e.g., most recent level completed and corresponding score. It is appreciated that in one embodiment, the profile handler 260 may use the template to tailor the received user specific data based on aesthetic preferences of the user. It is further appreciated that the profile handler 260 may further tailor the user specific data based on the locale of the user. The profile handler 260 may send a response back to the application, e.g., X-Box™ video game, notifying the application that the user profile has been successfully updated and/or extended and that the user profile is ready for rendition.

At step 365, the extended user profile that comprises the application is provided for rendition. For example, the extended user profile may be provided by the profile handler 260 to the user for rendering. At step 370, the extended user profile may be optionally rendered on a display, e.g., a liquid crystal display (LCD).

Update data may be pushed to the system 200 when an update to a user specific data and/or template is available. For example, when an updated user specific data is available, the user specific data may be pushed by using a representational state transfer (REST) style programmatic API call. When an update is available, at step 380 the identity of the user may be authenticated. For example, the authentication ensures that the user has consented and has authorized the user profile to be update with the application pushing the user specific content. It is appreciated that authentication may also include authenticating the application and conformity of the data being pushed.

When the user is authenticated, at step 390, the updated information may be received to update data. For example, when the update information is for the user specific data, the updated user specific data replaces the old user specific data. The update information may then be stored for subsequent use. It is appreciated that the template may be updated in a similar fashion.

Referring now to FIG. 4, a flowchart 400 of an exemplary process for updating a user profile, in accordance with an embodiment is shown. At step 410, the system 200 may receive an API call to update a user specific data. For example, the API call may be received when an update to user specific data is available upon which the application making the API call pushes the update to the system 200. The user specific data may be pushed using a representational state transfer (REST) style programmatic API call.

At step 420, the user is authenticated in order to verify that the API call is from an authorized application and an authorized user. At step 430, the service API may be accessed when the user is authenticated. As such, at step 440, the user specific data may be generated and updated by using the service API, e.g., metadata and user setting is provided and the user specific data is received and the old user specific data is updated.

At step 450, the updated user specific data may be stored for subsequent use and rendition as part of the user profile. It is appreciated that the user specific data may be in a markup language format, e.g., extensible markup language (XML), hypertext markup language (HTML), extensible HTML (XHTML), etc. Optionally, at step 460, the API handler may respond back to the application making the API call that the received information has been used to update the user specific data and that the new information is available for rendition as part of the user profile.

The updated information, e.g., updated user specific data, and a template from the application template module 220 may be used by the profile handler 260 in order to tailor the updated user specific data based on aesthetic preferences of the user. At step 470, the updated user specific data that is tailored may be provided for rendition as part of the user profile. It is appreciated that the profile handler 260 may also use the localization handler module 230 to localize the user specific data that is tailored according to geographical location of the user. For example, if the user resides in Italy, the user specific data that is tailored may also be tailored for rendition in Italian. At step 480, the updated user profile may be optionally rendered, e.g., using an LCD display.

It is appreciated that a similar flow diagram may be used in order to update the template. The updated template may subsequently be stored in the application template module 220 for later use.

Figure 5:
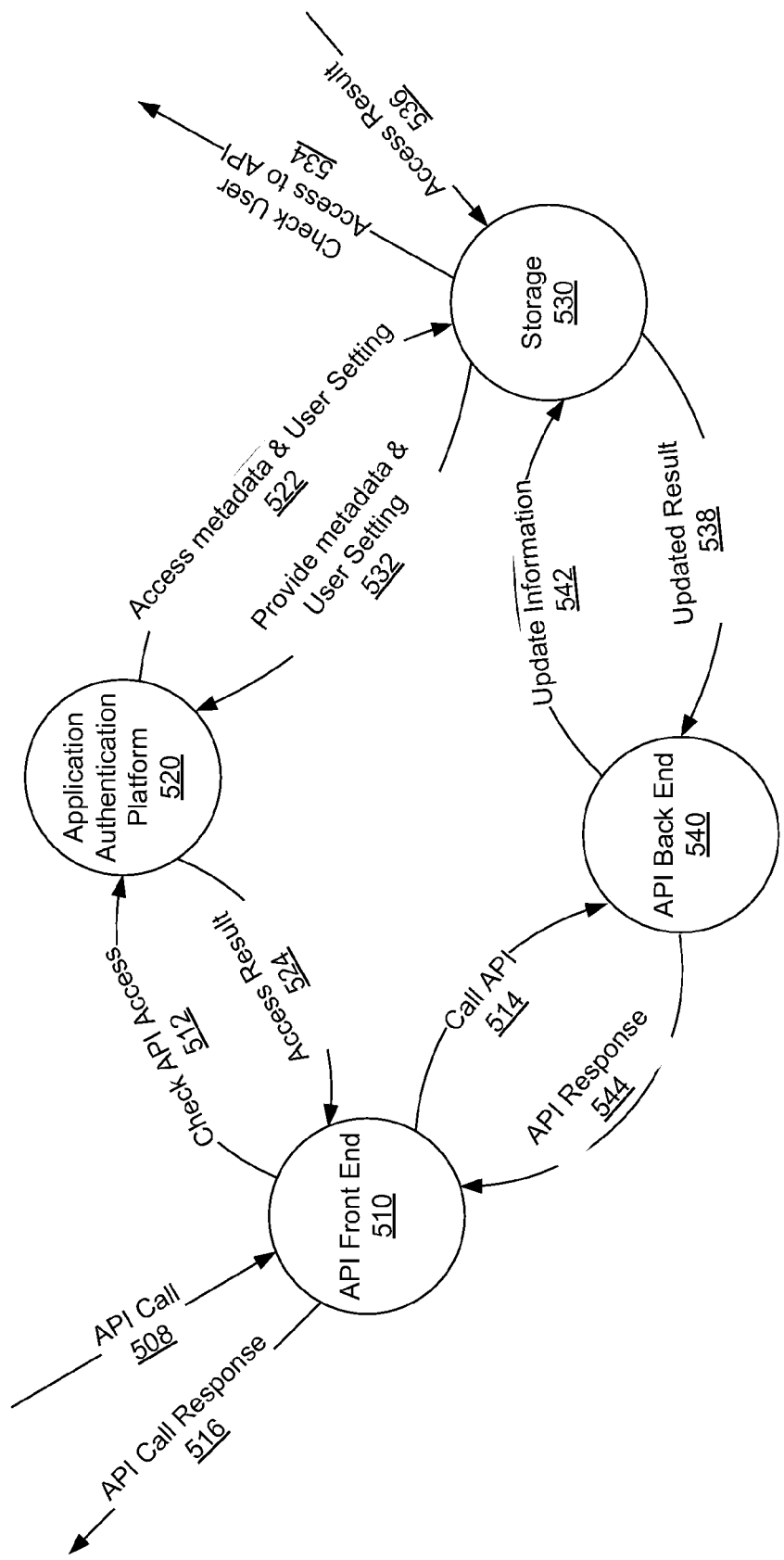
FIG. 5 shows an exemplary illustration of data flow for updating a user profile, in accordance with an embodiment.

Referring now to FIG. 5, an exemplary illustration of data flow for updating a user profile, in accordance with an embodiment is shown. At step 508, an API call is received from an application, e.g., X-Box™ video game. The API call may be received when an update for a user specific data is available, e.g., new level and score completed. The API call may be a representational state transfer (REST) style programmatic API call that pushes the user specific data. It is appreciated that the API call may comprise a REST API uniform resource locator (URL), parameters and delegation tokens. The API front end 510 receives the API call and sends a query to check API access 512.

An application authentication platform 520 receives the query to check API access 512. The application authentication platform 520 may send a query to access the metadata and user setting 522, e.g., application identification, user caller identification (CID) from a storage 530. In response to the query, the storage 530 provides metadata and user settings 532, e.g., application metadata, user specific data, etc. Based on the received metadata and the user settings 532, the application authentication platform 520 decides whether access should be granted to the application making the API call. The access result 524 is communicated to the API front end 510.

If access is granted, the API front end 510 transmits the API call 514 query to the API back end 540. For example, the API call 514 may be a call service API and comprise of API URL, parameters, user specific data, template, locale of the user, application identification, user CID, passport unique identifier (PUID), etc. Thus, the API back end 540 may send a query to update information 542, e.g., user specific data, by storing the update information in the storage 530. The result of the update that includes the user specific data, e.g., updated result 538, may be sent back to the API back end 540. The API back end 540 may send an API response 544 to the API front end 510. The API front end 510 may optionally respond back to the application by sending an API call response 516. The API call response 516 may be an indication that the information, e.g., user specific data, has been updated and that the updated user profile is available for rendition as part of the user profile.

It is appreciated that once the information, e.g., user specific data, has been updated, the profile handler 260 may update the profile as described above. Thus, the updated profile is provided for rendition and may be rendered using a display. In one embodiment, the updated user specific data is tailored based on the template to provide the "look and feel" of the application in accordance with aesthetic preferences of the user. It is appreciated that the tailored information may also be tailored based on the locale of the user, as presented and discussed above.

It is appreciated that the user specific information, template, etc., may be in markup language format, e.g., extensible markup language (XML), hypertext markup language (HTML), extensible HTML (XHTML), etc. As such, the profile handler 260 may resolve the markup language into HTML and present the resolved information to the viewing browser as a portion of the user profile.

As a result, a user profile may be extended in a social network site. Moreover, the user specific information may be automatically supplied for rendition as part of the user profile. Furthermore, the user specific information may be automatically updated and tailored based on the aesthetic preferences and/or geographical location of the user.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of extending a user profile, said method comprising:
   receiving user specific data related to an application, said user specific data operable to be rendered and integrated within said user profile;
   receiving a template for said application, said template operable to tailor said user specific data based on aesthetic preference of a user to generate tailored user specific data;
   based on said user specific data for said application and said template for said application, extending said user profile to comprise said tailored user specific data; and
   based on said extending, providing said user profile for rendering, said user profile comprising said tailored user specific data, at least some of at least one of said receiving user specific data, said receiving a template, said extending, and said providing implemented, at least in part, via a microprocessor.

2. The method as described in claim 1, comprising:
   determining local information for said user based on a geographical location of said user, said user profile tailored based on said local information.

3. The method as described in claim 1, said user specific data in a markup language format.

4. The method as described in claim 1, comprising:
   storing said user specific data; and
   storing said template for said application.

5. The method as described in claim 1, comprising:
   rendering said user profile.

6. The method as described in claim 1, comprising:
   authenticating said user.

7. The method as described in claim 1, said template in a markup language format.

8. The method as described in claim 1, comprising:
   receiving an update for said user specific data for said application; and
   based on said update for said user specific data, providing an updated user profile comprising said update for said user specific data that is tailored based on said template, said updated user profile operable for rendering.

9. The method as described in claim 8, comprising:
   storing said update for said user specific data.

10. The method as described in claim 1, comprising:
    receiving an update for said template for said application; and
    based on said update for said template, providing an updated user profile comprising said user specific data that is tailored based on said update for said template, said updated user profile operable for rendering.

11. The method as described in claim 10, comprising:
    storing said update for said template.

12. A computer storage device comprising computer-executable instructions for updating a user profile, which when executed via a microprocessor perform actions comprising:
    receiving an application programming interface (API) call to update user specific data related to an application, said update of said user specific data operable to be rendered and integrated within said user profile, said update operable to result in an updated user specific data;
    authenticating a user;
    responsive to said authenticating, storing said updated user specific data;
    generating an updated user profile based on said updated user specific data and a template for said application, said template configured to tailor said updated user specific data based on aesthetic preference of said user to generate updated tailored user specific data; and
    providing said updated user profile, said updated user profile operable for rendering.

13. The computer storage device of claim 12, said actions comprising:
    tailoring said updated user specific data based on a geographical locality of said user.

14. The computer storage device of claim 12, said updated user specific data in extensible markup language (XML) format.

15. The computer storage device of claim 12, said actions comprising:
    rendering said updated user profile.

16. The computer storage device of claim 12, said updated user specific data pushed when said update is available.

17. A system for extending a user profile comprising:

an application programming interface (API) handler operable to receive an API call to receive user specific data;

a user content receiver module operable to store and provide said user specific data related to an application, said user specific data operable to be rendered and integrated within said user profile;

an application template module operable to store and provide a template operable to tailor said user specific data based on aesthetic preference of a user; and a profile handler operable to extend said user profile to comprise tailored user specific data based on said template within said application template module and said user specific data, said user profile operable for rendering, at least some of at least one of said API handler, said user content receiver module, said application template module, and said profile handler implemented, at least in part, via a microprocessor.

18. The system of claim 17, comprising:

a localization handler operable to tailor said user specific data based on geographical location of said user.

19. The system of claim 17, comprising:

an authentication module operable to authenticate said user and said authentication module operable to authenticate said application.

20. The system of claim 17, comprising:

a second application programming interface (API) handler operable to receive an update for said user specific data, said second API handler operable to receive an update for said template, said update for said user specific data and said update for said template stored.

* * * * *